United States Patent [19]

Wilson

[11] Patent Number: 4,656,809

[45] Date of Patent: Apr. 14, 1987

[54] PROFILED SHEET MATERIAL

[75] Inventor: Frederick G. Wilson, Co. Antrim, Northern Ireland

[73] Assignee: Wilson Double Deck Trailers Limited, Lisburn, Northern Ireland

[21] Appl. No.: 793,689

[22] PCT Filed: Feb. 25, 1985

[86] PCT No.: PCT/GB85/00075

§ 371 Date: Oct. 21, 1985

§ 102(e) Date: Oct. 21, 1985

[87] PCT Pub. No.: WO85/03679

PCT Pub. Date: Aug. 29, 1985

[30] Foreign Application Priority Data

Oct. 13, 1984 [GB] United Kingdom ............... 8425915
Feb. 25, 1985 [GB] United Kingdom ............... 8404977

[51] Int. Cl.$^4$ .............................................. E04C 2/32
[52] U.S. Cl. ....................................... 52/795; 52/630; 296/181; 296/182; 296/183
[58] Field of Search ............... 52/795, 801, 630, 376; 296/182, 181, 183, 191, 203; 105/422

[56] References Cited

U.S. PATENT DOCUMENTS 2,900,926 8/1959 Neuhart ......................... 52/376 X
3,028,192 4/1962 Jewell .
3,185,112 5/1965 Johnston ............................. 52/801
3,200,549 8/1965 Cripe .................................. 52/376
3,496,691 2/1970 Seaburg et al. ................ 52/630 X
3,583,123 6/1971 Helmgreen et al. .
3,715,846 2/1973 Sullhofer ........................ 52/796 X

FOREIGN PATENT DOCUMENTS 1975606 12/1967 Fed. Rep. of Germany .
6932746 11/1969 Fed. Rep. of Germany .
1418698 8/1970 Fed. Rep. of Germany .
8200019 4/1982 Fed. Rep. of Germany .
1333453 10/1973 United Kingdom .

OTHER PUBLICATIONS

European Patent Office Search Report (Jul. 25, 1985).

Primary Examiner—Carl D. Friedman
Attorney, Agent, or Firm—Mason, Fenwick & Lawrence

[57] ABSTRACT

A profiled sheet material is formed into side panels and floor or deck panels for use of example in the manufacture of high-sided lorries, trailers and containers. The profiled sheet material (10) has a plurality of parallel deformations (11) which in cross section are substantially triangular with the base (12) of each deformation spaced from the body of the sheet. The apex of each deformation is formed by closely abutting curved faces of the sheet material (1) where the body of the sheet material is bent into the deformation. Floor or deck plates incorporates strips of timber (50) whose longitudinal faces are tapered. These are located between adjacent pairs of deformations (11) with a tapered faces abutting the respective sides (42,43) of the deformations. A series of indents (41) are also formed along the length of the web (12) of the U-formation. The U-formation is then deformed by pressing the tops of both limbs (42,43) inwardly towards each other to form a triangular formation.

8 Claims, 9 Drawing Figures

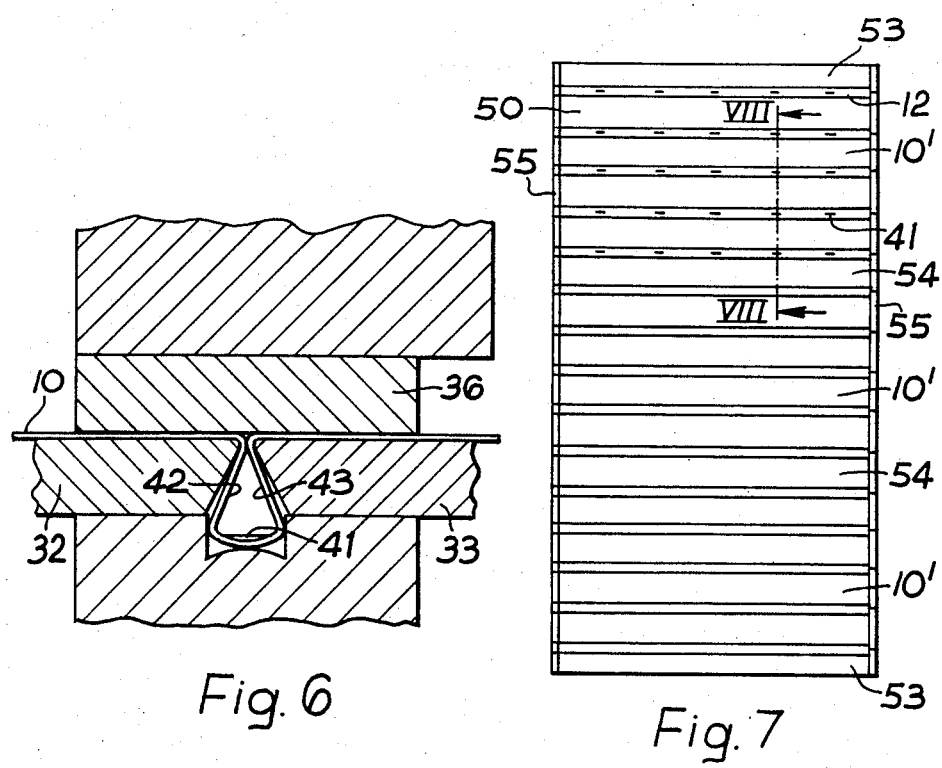
Fig. 6
Fig. 7
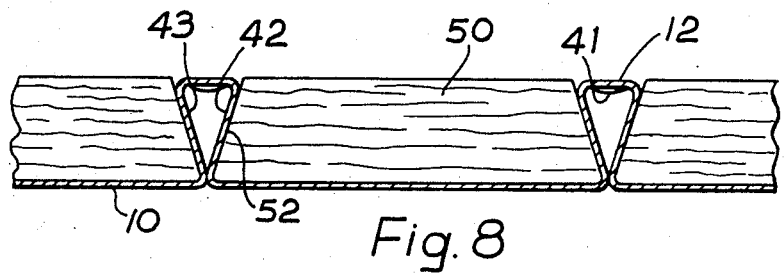
Fig. 8
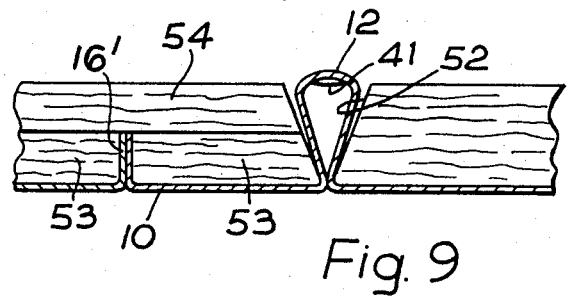
Fig. 9

PROFILED SHEET MATERIAL

BACKGROUND OF THE INVENTION

This invention relates to profiled sheet material and to side walls and floors or decks formed therefrom, especially but not exclusively, for use in the manufacture of high-sided lorries, trailers and containers.

Profiled sides of lorries, trailers and containers are well known, formed of sheet steel which is corrugated (vertically) for strength, but one disadvantage of these sheets is their high resistance to wind which results in increased fuel consumption. In addition, operators of such vehicles use the sides for promoting their name etc. and it is difficult to paint on or to read the wording on corrugated sides.

An object of the invention is to provide a profiled side which will present a substantially smooth outer surface.

Another object of the invention is to provide a floor or deck of shallow depth but relatively high strength.

SUMMARY OF THE INVENTION

According to one aspect of the invention there is provided a profiled sheet material having a plurality of parallel deformations which in cross section are substantially triangular with the base of each deformation spaced from the body of the sheet, the apex of each deformation being formed by closely abutting curved faces of the sheet material where the body of the sheet material is bent into the deformation.

Preferably, a strip of timber whose longitudinal faces are tapered is located between adjacent pairs of deformations with the tapered faces abutting the respective sides of the deformations.

According to another aspect of the invention there is provided a method of forming a profiled sheet material comprising the steps of passing the sheet material into a press to form a series of U-shaped channels therein one at a time and forming a series of indents along the length of the web of said formation causing the U-formation to be deformed by pressing the tops of both limbs inwardly towards each other to form a triangular formation and thereafter causing the top of the limb on one side to be pushed beyond the meeting line with the other limb causing consequential movement thereof and subsequently causing the second limb to be similarly moved against the first limb thereby to form triangular strengthening members with the apex of each formed by the tops of both limbs closely abutting each other.

Preferably, the web of each U-formation is concaved towards the limbs.

Embodiments of the present invention will now be described by way of example, with reference to the accompanying drawings.

BRIEF DESCRIPTION OF THE DRAWINGS

FIGS. 3 to 6 illustrate the operational sequence for deforming the sheet material;

FIG. 7 is a plan view of a section of a floor or deck formed of profiled sheet material reinforced with boarding;

FIG. 8 is a fragmentary cross section to an enlarged scale of the floor/deck on the line VI—VI of FIG. 7 and FIG. 9 is a fragmentary cross section of the floor/deck illustrating details.

DETAILED DESCRIPTION OF THE INVENTION

Figure 1:
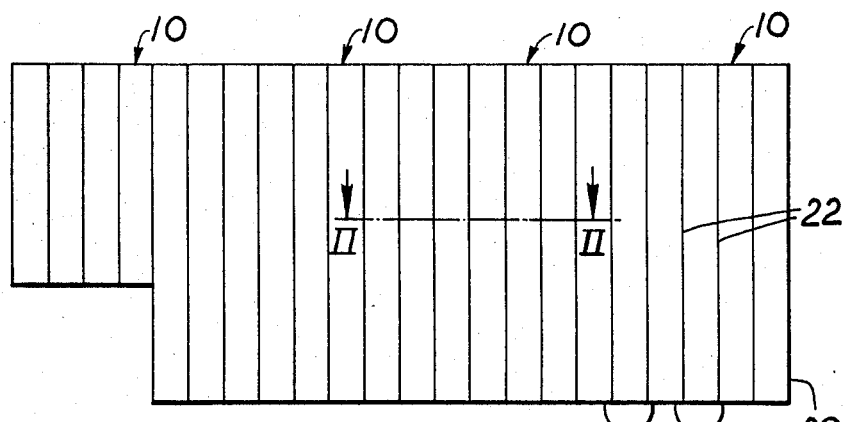
FIG. 1 is an elevation of a side wall of a high sided vehicle formed of profiled sheet material according to the invention.
Figure 2:
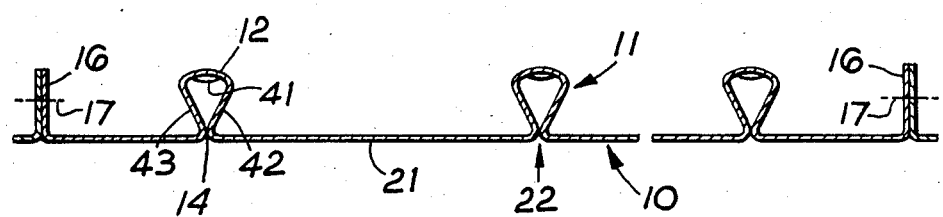
FIG. 2 is a plan view to an enlarged scale on the line II—II of FIG. 1 illustrating a section of side wall.
Figure 3:
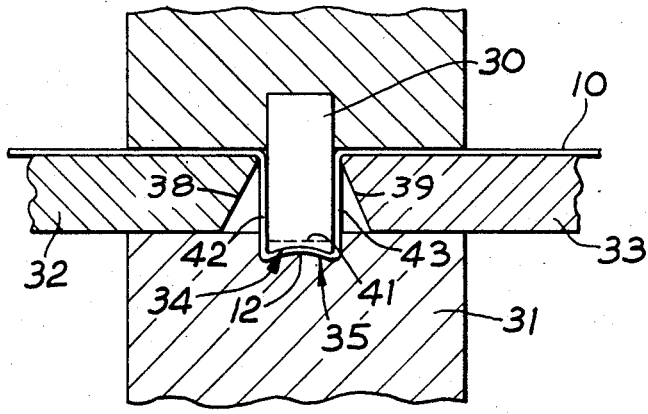
Figure 4:
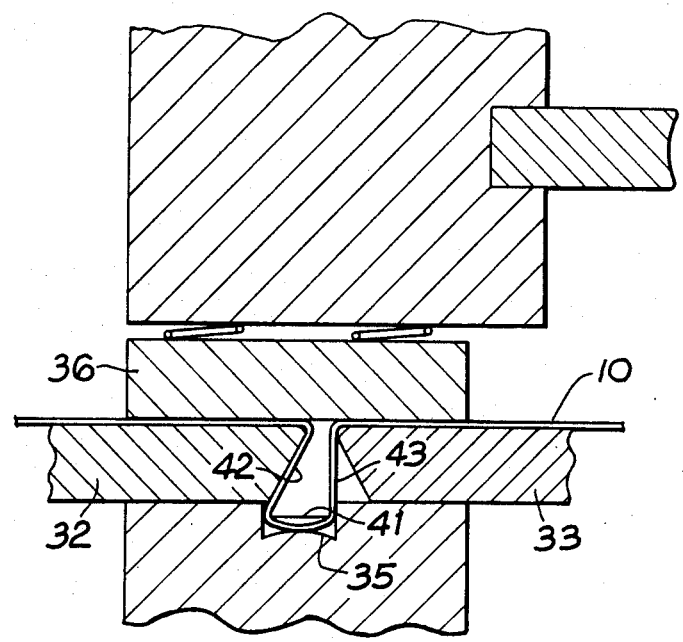
Figure 5:
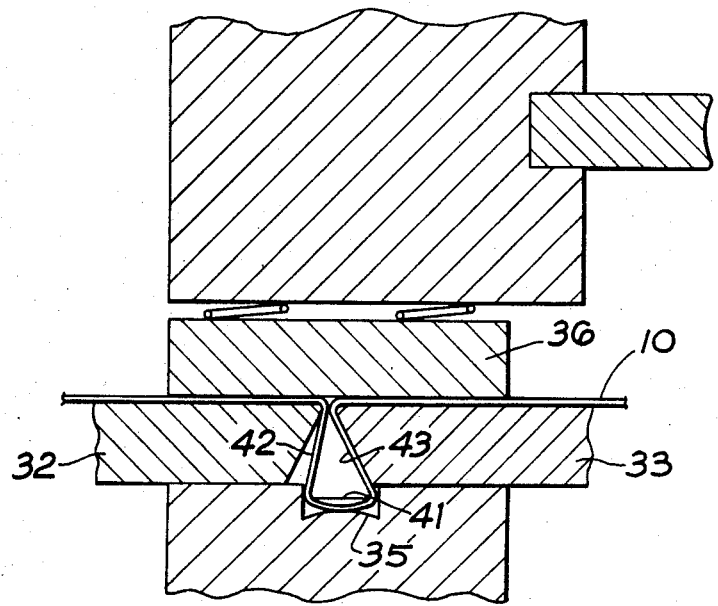

Referring firstly to FIGS. 1 to 6 sheets of steel plate 10 are provided with a plurality of parallel deformations 11 which in cross section are substantially triangular with the base 12 of each deformation spaced from the body 13 of the sheet. The apex 14 of each deformation is formed by closely abutting curved faces where the body of the sheet is bent into the deformation. The sides 16 of the plate parallel to the depressions are bent through 90° to form faces by which adjacent sheets can be secured together by weld or rivet 17.

Thus, a side wall 20 can be formed of a plurality of these sheets 10 to provide an outer face 21 which is substantially flat apart from a series of parallel shallow grooves 22 and an inner face 23 which has a series of parallel strengthening ribs 11. When paint is applied to the outer face the shallow grooves 22 are made even shallower or become filled in.

These side walls 20 have many applications, for example in the construction of high sided lorries, trailers and containers.

In this specific example the triangular deformations are formed one at a time in a press as illustrated in FIGS. 3 to 6. Firstly, the sheet of steel plate 10 is placed in the press and full pressure applied to bring a male die 30 down onto a female die 31 to bend the plate into a channel of U-shaped cross section (FIG. 3) between two horizontal dies 32, 33. The leading face 34 of the male die 30 is slightly concave and the bottom face 35 of the female die 31 is correspondingly convex so that the web 12 of the U-formation is upwardly convex. In addition, the dies 30, 31 form a series of square raised indentations 41 spaced along the channel.

After formation of the U-section channel, the male die 30 is withdrawn and replaced by a block 36 which overlies the sheet of plate 10 and presses against it under spring pressure.

The two horizontal dies 32, 33 have sloping leading faces 38, 39 and deform the U-shaped limbs 42, 43 (FIG. 3) into a triangular shape (FIG. 6); firstly pressure is applied to one of the dies 33 to bend one limb 42 of the U-formation towards the other limb 43, forcing it a few mm over the centre line of the U-formation. As this deformation takes place, the web 12 becomes concave (FIG. 4) and the square indentations begin to decrease in width. The pressure on die 33 is then reduced and pressure applied to the other side 34 to similarly deform the other limb 43. Then equal pressure is applied by both horizontal dies 33, 34 and full downward pressure applied to the block 36. This has the effect of flattening the web 12 and increasing the angle of divergence of the two limbs 42, 43 to their final state.

The purpose of over bending the limbs is to prevent them springing-apart at their abutment when die-pressure is released. The closely abutting limbs thus form a substantially smooth surface on one side of the sheet material. It has been found that when forming a triangular formation by bending the limbs inward to touch at their apex, the web curves away from the apex to give a reflexing action after formation causing the limbs to spring-apart at the apex so that the curved faces do not closely abut. The indenting of the web prevents this reflexing action of the web.

The procedure is repeated at intervals of about 13 to 18 cms across the sheet of steel plate so that a plurality of triangular deformations are formed in the profiled plate.

Each profiled plate may be 2.5 m long, 1 m wide and the triangular deformations or strengthening ribs may be 32 mm deep.

The indents 41 are shown on one of the plates illustrated in FIG. 9.

In a second embodiment, the deformed plate 10' is reinforced with timber boards 50 to form a composite profiled plate for use in flooring and decking 51 as illustrated in FIG. 9.

The plate 10' is deformed as before up to the final pressure stage, before which the timber boards 50 are inserted into the space between adjacent deformations 11 and secured by glue. The longitudinal sides 52 of each board are tapered to correspond with the final angle of the limbs 42, 43 of the deformations so that, at the final pressure stage the limbs closely abut the timber boards (FIG. 8) and further hold them captive. The web 12 of each deformation is individually flattened to the level of the boards during the final pressure stage. The flanged sides 16' of the plate 10' for use as flooring and decking have shorter flanges than in the side wall plates 16. As illustrated in FIG. 9, shallow timber half boards 53 are placed in the space between the flanges 16' and adjacent deformations 11 up to the level of the flanges to complete the formation of a profiled floor/deck plate.

To form a floor/deck section, a number of these plates are welded to longitudinal beams 55 with their flanges 16' abutting. A shallow timber board 54 having non-tapered sides is then glued on top of each pair of half boards 53.

The floor or deck 51 is formed with the boarding 50, 54 uppermost. The substantially flat under face may be treated with weatherproofing before or after formation of the triangular ribs 11 but the portions of the plate forming the inside of the triangular ribs must be treated, if necessary, before formation.

The uses to which side plates and floor/deck plates can be put is not restricted to lorries, trailers and containers; other uses include railway rolling stock and permanent or temporary building structures.

An advantage of a side wall as hereinbefore described is while it is ribbed for strength its outer face is substantially flat and therefore gives less resistance to wind and a more suitable surface to carry written matter.

An advantage of the composite floor/deck plate is that with the wood supports encased in the plate rather than placed upon it as has been previous practice the height of the floor, e.g. of a low lying trailer is further reduced by the depth of the timber boards, i.e. 32 mm which, over the area of a trailer or container gives an acceptable increase in the capacity of the trailer or container.

I claim:

1. A vehicle having side walls comprising a rigid profiled sheet material having a plurality of parallel deformations which in cross section are substantially triangular with the base of each deformation spaced from the body of the sheet, the apex of each deformation being formed by closely abutting curved faces of the sheet material where the body of the sheet material is bent into the deformation, forming an outer face which is substantially flat and an inner face which has a series of parallel strengthening ribs, the outer face comprising the outer surface of a side wall of the vehicle.

2. A vehiclee according to claim 1, characterized in that a strip of timber whose longitudinal faces are tapered is located between adjacent pairs of deformations with the tapered faces abutting the respective sides of the deformations.

3. A vehicle having a floor or deck plate comprising a profiled sheet material supporting timber boards, characterized in that the profiled sheet material comprises a plurality of parallel deformations which in cross section are substantially triangular with the base of each deformation spaced from the body of the sheet material is bent into the deformation, the deformations upstanding from the body of the sheet material and enclosing timber boards between adjacent deformations, the base of the deformations lying substantially on a level with the upper surface of the timber board and forming with the upper surface of the timber board the inside surface of the floor or deck plate and the body of the sheet material forming an outer face which is substantially flat.

4. A vehicle according to claim 3, characterized in that side angles are provided parallel to said deformations and are of a height less than the height of the deformations and timber boards are located between each flange and the adjacent deformations, said boards extending to a height level with the top of the flange.

5. A vehicle according to claim 3, characterized in that the body of the sheet comprises the outer surface of the floor or deck plate of the vehicle.

6. A structure having side walls comprising a rigid profiled sheet material having a plurality of parallel deformations which in cross section are substantially triangular with the base of each deformation spaced from the body of the sheet, the apex of each deformation being formed by closely abutting curved faces of the sheet material where the body of the sheet material is bent into the deformation, forming an outer face which is substantially flat and an inner face which has a series of parallel strengthening ribs, the outer face comprising the outer surface of a side wall of the structure, a strip of timber whose longitudinal faces are tapered being located between adjacent pairs of deformations with the tapered faces abutting the respective sides of the deformations.

7. A structure having a composite floor or deck plate comprising a profiled sheet material supporting timber boards, characterised in that the profiled sheet material comprises a plurality of parallel deformations which in cross section are substantially triangular with the base of each deformation spaced from the body of the sheet, the apex of each deformation being formed by closely abutting curved faces of the sheet material where the body of the sheet material is bent into the deformation, the deformations upstanding from the body of the sheet material and enclosing timber boards between adjacent deformations, the base of the deformations lying substantially on a level with the upper surface of the timber board and forming with the upper surface of the timber board the inside surface of the floor or deck plate and the body of the sheet material forming an outer face which is substantially flat.

8. A structure according to claim 7, characterised in that side flanges are provided parallel to said deformations and are of a height less than the height of the deformations and timber boards are located between each flange and the adjacent deformations, said boards extending to a height level with the top of the flange.

* * * * *